United States Patent [19]

Kuwabara et al.

[11] Patent Number: 5,122,545

[45] Date of Patent: Jun. 16, 1992

[54] PRODUCTION METHOD OF PREFOAMED SYNTHETIC RESIN PARTICLES

[75] Inventors: Hideki Kuwabara; Hidehiro Sasaki; Masato Naito; Kazuo Turugai, all of Utsunomiya, Japan

[73] Assignee: JSP Corporation, Tokyo, Japan

[21] Appl. No.: 617,578

[22] Filed: Nov. 26, 1990

[30] Foreign Application Priority Data

| Nov. 24, 1989 [JP] | Japan | 1-307868 |
| Nov. 24, 1989 [JP] | Japan | 1-307869 |
| Jul. 30, 1990 [JP] | Japan | 2-202238 |

[51] Int. Cl.$^5$ ............................................. C08J 9/18
[52] U.S. Cl. .......................................... 521/60; 521/56; 521/57; 521/143
[58] Field of Search .................... 521/56, 60, 57

[56] References Cited

U.S. PATENT DOCUMENTS

| 4,226,942 | 10/1980 | Wei | 521/60 |
| 4,303,756 | 12/1981 | Kojimura et al. | 521/59 |
| 4,436,840 | 3/1984 | Akiyama et al. | 521/60 |
| 4,602,047 | 7/1986 | Endo et al. | 521/60 |
| 4,676,939 | 6/1987 | Kuwabara | 521/60 |
| 4,908,393 | 3/1990 | Arai et al. | 521/60 |
| 4,948,817 | 8/1990 | Kuwabara et al. | 521/60 |
| 5,015,667 | 5/1991 | Yoshimura et al. | 521/60 |
| 5,032,620 | 7/1991 | Arai et al. | 521/60 |

*Primary Examiner*—Morton Foelak
*Attorney, Agent, or Firm*—Sherman and Shalloway

[57] ABSTRACT

Prefoamed synthetic resin particles are produced by dispersing foamable resin particles in a dispersing medium within a closed vessel, said foamable resin particles containing a water-soluble inorganic substance and a blowing agent therein, and then releasing the foamable resin particles and the medium into an atmosphere of a pressure lower than that inside the vessel, whereby the thus-released foamable resin particles are allowed to undergo foaming.

17 Claims, 1 Drawing Sheet

PRODUCTION METHOD OF PREFOAMED SYNTHETIC RESIN PARTICLES

BACKGROUND OF THE INVENTION a. Field of the Invention:

The present invention relates to a production method of prefoamed synthetic resin particles.

b. Description of the Related Art:

A process has conventionally been known, in which resin particles with a volatile blowing agent contained therein is dispersed in a dispersing medium such as water within a closed vessel, the resulting dispersion is heated to a temperature at least equal to the softening temperature of the resin particles with the internal pressure of the vessel being held at least equal to the vapor pressure of the blowing agent, thereby impregnating the resin particles with the blowing agent, and the vessel is opened at one end thereof to release the thus-impregnated resin particles and the dispersing medium into an atmosphere having a pressure lower than that inside the vessel, whereby the resin particles are allowed to undergo foaming. Exemplary volatile blowing agents useful in the practice of the above process primarily include hydrocarbons such as propane, butane and pentane; and halogenated hydrocarbons such as trichlorofluoromethane and dichloro-difluoromethane. Under the current circumstances, many of compounds employed as these volatile blowing agents however involve problems such as toxicity, inflammability and/or the like or the problem of ozonosphere destruction like flons or, even if rather free of serious problems from the standpoint of hazards or environmental destruction, the problem that the price is too high to permit commercial use. Further, a volatile blowing agent induces swelling of resin particles, thereby restricting the appropriate foaming temperature range upon foaming. As a result, the foaming temperature gives greater influence to the expansion ratio, leading to the problem that control of the expansion ratio becomes difficult.

A great deal of research has been made with a view toward overcoming these problems. The present inventors has also proceeded with an extensive investigation to solve such problems. The present inventors' investigation has already led to the proposal of processes for obtaining prefoamed synthetic resin particles by using a blowing agent of the inorganic gas type whose use as a blowing agent had never been thought of (for example, Japanese Patent Publication No. 61227/1987, Japanese Patent Application Laid-Open No. 2741/1986, Japanese Patent Application Laid-Open No. 4738/1986, etc.). The use of a blowing agent of the inorganic gas type however involves the problem that it hardly permits high-temperature foaming and hence the production of a foamed product having a high expansion ratio, because the blowing agent has poor impregnation property into resin particles and, moreover, secondary crystallization of the resin particles can be scarcely promoted. A blowing agent of the inorganic gas type is also accompanied by the problem that the reduction of expansion ratio becomes more conspicuous along the passage of time from the initiation of foaming, for example, an expansion ratio of about 20–30 times in the beginning of a foaming operation may decrease to an expansion ratio of about 10 times near the end of the foaming operation, resulting in substantial variations in expansion ratio.

SUMMARY OF THE INVENTION

The present inventors have proceeded with a further extensive investigation to overcome the above problems. As a result, the present inventors have found a process which permits the provision of prefoamed particles of a high expansion ratio even when they are produced on an industrial scale by using a blowing agent of the inorganic gas type and which, when a conventional volatile blowing agent is used, allows to reduce the amount of the blowing agent to be employed and permits the provision of prefoamed particles of a high expansion ratio still more stably than the process disclosed in Japanese Patent Application Laid-Open No. 4738/1986, leading to the completion of the present invention.

In one aspect of the present invention, there is thus provided a method for the production of prefoamed synthetic resin particles, which comprises:

dispersing foamable resin particles in a dispersing medium within a closed vessel, said foamable resin particles containing a water-soluble inorganic substance and a blowing agent therein; and releasing the foamable resin particles and the medium into an atmosphere of a pressure lower than that inside the vessel, whereby the thus-released foamable resin particles are allowed to undergo foaming.

The present invention has numerous advantages. Since the foamable resin particles containing the water-soluble inorganic substance and the blowing agent are caused to undergo foaming in the process of the present invention, prefoamed particles of a high expansion ratio can be obtained easily even when a blowing agent of the inorganic gas type is used. When a volatile blowing agent is used, the process of the present invention makes it possible to reduce the amount of the volatile blowing agent to be used compared to the conventional processes which also make use of a similar volatile blowing agent and hence to permit the production of prefoamed particles of a high expansion ratio even when the volatile blowing agent is used in a small amount.

An inorganic gas can be used as the blowing agent. In this case, upon releasing the foamable resin particles into the atmosphere having the pressure lower than that inside the vessel and allowing them to undergo foaming, the same inorganic gas as the blowing agent or a mixed gas of the same inorganic gas as the blowing agent and another inorganic gas may be fed into the vessel to apply a back pressure so that the foaming can be conducted while maintaining the internal pressure of the vessel at a level at least equal to the prefoaming partial pressure of the blowing agent inside the vessel. This makes it possible to minimize variations of expansion ratio despite of the use of the blowing agent of the inorganic gas type. As a result, it is possible to avoid the problem that prefoamed particles obtained near the end of a foaming operation may differ significantly in expansion ratio from those obtained shortly after the initiation of the foaming operation immediately, thereby making it possible to produce excellent prefoamed particles throughout the foaming operation. When the resin particles are held at their foaming temperature for a while after the same inorganic gas as the blowing agent or the mixed gas of the same inorganic gas as the blowing agent and another inorganic gas has been fed into the vessel in the above process, the prefoamed particles can be obtained with a still greater expansion ratio. Moreover, the oxidative deterioration of the resin particles and hence the prefoamed resin particles can be minimized even when an oxygen-bearing inorganic gas is used as the inorganic gas.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
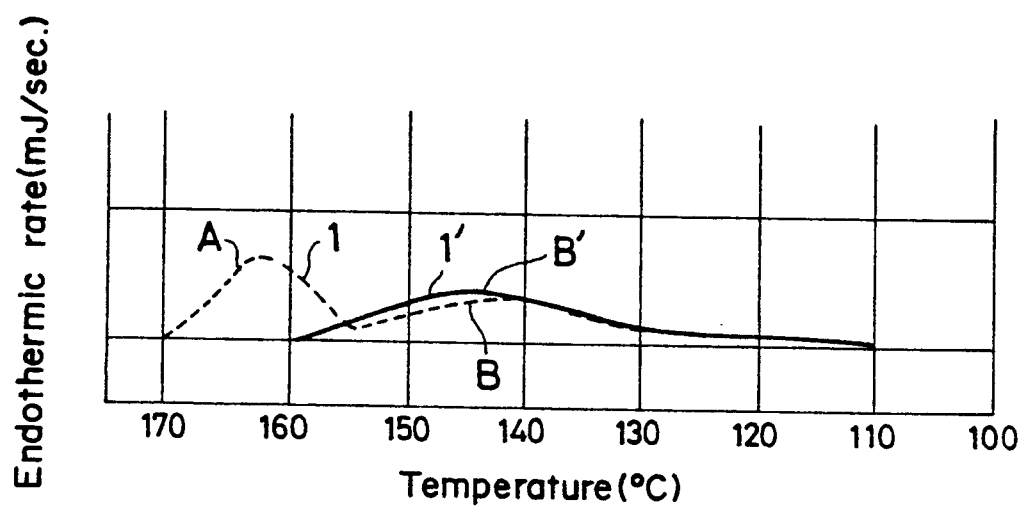
FIG. 1 is a diagram showing a DSC curve of prefoamed particles containing secondary crystals therein.

Exemplary resin particles usable in the present invention include particles of polypropylene resins such as propylene homopolymer, propylene-ethylene random copolymers, propylene-ethylene block copolymers, propylene-butene random copolymers, propylene-ethylene-butene random copolymers, etc.; and particles of polyethylene resins such as high-density polyethylene, low-density polyethylene, linear low-density polyethylenes, etc. which are copolymers of ethylene with small amounts of α-olefins (carbon numbers: 4, 6, 8, etc.). Of these, polypropylene resins—such as propylene-ethylene random copolymers, propylene-butene random copolymers and propylene-ethylene-butene random copolymers—and linear low-density polyethylenes are preferred. Although these resins may be crosslinked, uncrosslinked resins are particularly preferred.

As resin particles, those containing a water-soluble inorganic substance are used in the present invention. Preferably, the water-soluble inorganic substance has a solubility of at least 1 g per 100 g of water of 40° C, with 5 g or higher being especially preferred. Illustrative of the water-soluble inorganic substance include borax, nickel sulfate, manganese sulfate, sodium chloride, magnesium chloride, calcium chloride, etc. Among these, borax is preferred. These inorganic substances can be used either singly or in combination. Each inorganic substance can be incorporated in resin particles by kneading it in a molten resin, extruding the resultant mass into strands, quenching the strands and then pelletizing the quenched strands. The inorganic substance is usually added in the form of powder, but not particular limitation is imposed on its average particle size. It is however generally preferred to use a water-soluble inorganic substance having an average particle size of 0.1–150μm, notably 1–100 μm. It is preferable to add one or more of these water-soluble inorganic substances in a total amount such that their total content in the resin particles ranges from 0.01 wt.% to 2 wt.%, especially from 0.02 wt.% to 1 wt.%. Addition of one or more of such inorganic substances in a large excess is not preferred because the resulting prefoamed particles will be prone to shrinkage and will thus not be preferable from the viewpoint of moldability. On the other hand, addition of one or more of the above inorganic substances in an unduly small amount will not be able to bring about the advantages of the present invention The preferable average particle size of the resin particles containing such inorganic substance or substances is generally 0.3–5 mm with 0.5–3 mm being especially preferred.

In the present invention, the step in which the resin particles are impregnated with the blowing agent may be either before or after the step in which the resin particles are dispersed in the dispersing medium within the closed vessel. In general, the impregnation of the resin particles is however carried out in the course of the step in which the resin particles are dispersed in the dispersing medium and is heated to their foaming temperature. In this case, the resin particles can be impregnated with the blowing agent, after once dissolving or dispersing the blowing agent in the dispersing medium. Namely, the resin particles can be impregnated, for example, by charging the resin particles, the blowing agent and the dispersing medium in a closed vessel and then heating and pressurizing them under stirring.

Blowing agents useful in the present invention include volatile blowing agents such as propane, butane, pentane, hexane, cyclobutane, cyclohexane, trichlorofluoromethane dichlorodifluoromethane monochlorodifluoromethane, 1-chloro-1,1-difluoroethane, 1,1,1,2-tetrachloroethane 1,1-dichloro-2,2,2-trifluoroethane, 1,1,1-difluoroethane and 1-chloro-1,2,2,2-tretrafluoroethane; and blowing agents of the inorganic gas type such as nitrogen, carbon dioxide, argon, air or the like. Among these, nitrogen, carbon dioxide and air are particularly preferred. When these blowing agents of the inorganic gas type are used, it is preferable to feed them to raise the internal pressure of the vessel to 20–50 $kg/cm^2 \cdot G$.

Any dispersing medium can be used to disperse the resin particles as long as it does not dissolve the resin particles. Examples of the dispersing medium include water, ethylene glycol, glycerin, methanol, ethanol and the like. Water is usually employed.

Upon dispersing the foamable resin particles in the dispersing medium and then heating the resin particles to the foaming temperature, a fusion-bonding preventive can be used to prevent fusion-bonding of the resin particles. Any fusion-bonding preventive can be used regardless of whether it is inorganic or organic, so long as it is not dissolved in a dispersing medium such as water and is not molten under heat. Inorganic fusion-bonding preventives are generally preferred. Illustrative inorganic fusion-bonding preventives include aluminum oxide, titanium oxide, aluminum hydroxide, basic magnesium carbonate, basic zinc carbonate, calcium carbonate, tricalcium phosphate, and magnesium pyrophosphate. It is preferred to add one or more of these fusion-bonding preventives in combination with an emulsifier. Illustrative of the emulsifier include anionic surfactants such as sodium dodecylbenzenesulfonate and sodium oleate. As the above fusion-bonding preventive, those having an average particle size of 0.001–100 μm, especially 0.001–30 μm are preferred. Usually, the fusion-bonding preventive can be added preferably in an amount of 0.01–10 parts by weight per 100 parts by weight of the resin particles. Preferably, the emulsifier can be added generally in an amount of 0.001–5 parts by weight per 100 parts by weight of the resin particles.

In the process of the present invention, the inclusion of secondary crystals in the foamable resin particles is preferred. Prefoamed particles which have been obtained from foamable resin particles containing these secondary crystals have excellent moldability. The inclusion of secondary crystals in foamable resin particles is advantageous especially when the resin particles are made of a uncrosslinked polypropylene resin such as a propylene-ethylene random copolymer or an uncrosslinked linear low-density polyethylene resin. The existence of secondary crystals can be determined by whether or not a high-temperature peak on a side higher in temperature than an inherent peak attributed to endotherm upon so-called melting of the resin appears on a DSC curve obtained by differential scanning calorimetry of the resulting prefoamed particles. The inherent peak and high-temperature peak can each be determined by performing differential scanning calorimetry of the same sample twice. In this method, 1–10 mg of a sample (resin) is heated first to 220° C. at 10° C./min by a differential scanning calorimeter to obtain a first DSC curve. The sample is next cooled down from 220° C. to about 40° C. at a rate of 10° C./min and is again heated to 220° C. at 10° C./min, thereby obtaining a second DSC curve. By comparing the two DSC curves obtained as described above, the inherent peak and the high-temperature peak can be distinguished from each other. Since the inherent peak is an endothermic peak caused by so-called melting of the resin, it appears on both the first DSC curve and the second DSC curve. The highest temperature of the inherent peak may vary somewhat between the first measurement and the second measurement in some instances. The difference is however smaller than 5° C, usually not greater than 2° C. On the other hand, the high-temperature peak indicates an endothermic peak which appears on a side higher in temperature than the inherent peak on the first DSC curve. The existence of secondary crystals can be confirmed by the appearance of the high-temperature peak. When no substantial high-temperature peak appears, it is judged that no secondary crystals exist. With respect to the two DSC curves, the greater the difference between the highest temperature of the inherent peak appearing on the second DSC curve and that of the high-temperature peak appearing on the first DSC curve, the more desirable. The preferable temperature difference therebetween is at least 5° C. with 10° C. or greater being particularly preferred.

Figure 2:
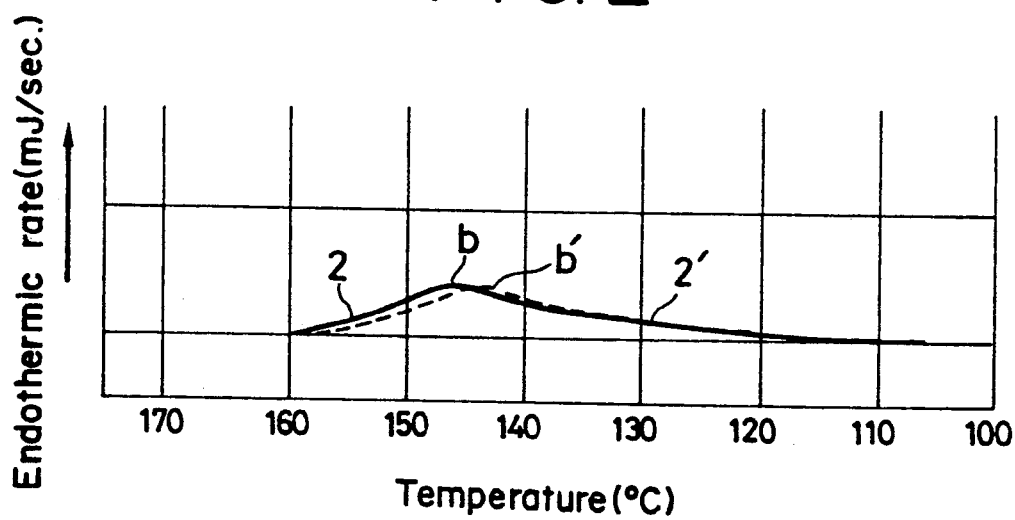
FIG. 2 is a diagram showing a DSC curve of prefoamed particles containing no secondary crystals therein.

FIGS. 1 and 2 show DSC curves obtained by differential scanning calorimetry of prefoamed particles. FIG. 1 corresponds to prefoamed particles containing secondary crystals and FIG. 2 to prefoamed particles free of secondary crystals. In FIGS. 1 and 2, Curves 1 and 2 are DSC curves obtained by the first measurement, while Curves 1' and 2' are DSC curves obtained by the second measurement. As is shown in FIG. 1, on Curve 1 obtained by the first measurement, a high-temperature peak A which is not seen on Curve 1' obtained by the second measurement has appeared in addition to Inherent Peak B (Inherent Peak B' only appears on Curve 1' obtained by the second measurement). The existence of secondary crystals is confirmed by the appearance of the High-Temperature Peak A. In the case of prefoamed particles containing no secondary crystals on the other hand, as illustrated in FIG. 2, Inherent Peaks b, b' on Curves 2, 2' respectively but no high-temperature peaks appear. This makes it possible to confirm non-existence of secondary crystals. Particles in which existence of secondary crystals is not recognized like the prefoamed particles shown in FIG. 2 are obtained when the particles are allowed to undergo foaming at a temperature equal to or higher than their melting completion temperature without being subjected to heat treatment at a secondary crystallization promoting temperature (from the melting point to the melting completion temperature) for any sufficient time. When blowing agent of the inorganic gas type is used, prefoamed particles containing secondary crystals as shown by Curve 1 can be produced, for example, by a process as will be described next. In the case of a uncrosslinked polypropylene resin, such prefoamed particles can be obtained generally by holding resin particles at a temperature at least equal to (their melting point minus 20° C.) or so but lower than their melting completion temperature for a sufficient time, usually for 5–90 minutes, preferably for 15–60 minutes in a pressure vessel without raising the temperature of the resin particles to their melting completion temperature or higher. In the case of an uncrosslinked linear low-density polyethylene on the other hand, it is usually necessary to hold resin particles at a temperature at least equal to (their melting point minus 15° C.) or so but lower than their melting completion temperature for a sufficient time, generally for 5–90 minutes, preferably for 5–30 minutes in a pressure vessel without raising the temperature of the resin particles to their melting completion temperature or higher. Although the resin particles used in the above heating step may be foamable resin particles in which a blowing agent has already been incorporated, resin particles may be impregnated with the blowing agent concurrently with their heating in the heating step. In the case of resin particles in which secondary crystals have already been formed by heating and holding starting resin particles at such a temperature, prefoamed particles having good moldability can still be obtained even when the foaming temperature upon releasing the thus-heated foamable resin particles into an atmosphere having a pressure lower than that inside the vessel to allow them to undergo foaming (i.e., the temperature at the time of releasing) is equal to or higher than their melting completion temperature, so long as the foaming temperature is a temperature not higher than the high-temperature peak described above.

To facilitate control of the temperature, it is desirable to carry out the above heating and holding step as a plurality of sub-steps at different temperatures. In this case, the holding temperature in each sub-step is controlled higher than that in the preceding sub-step It is desirable to set the holding temperature of the last sub-step equal to the foaming temperature. Upon conducting the heating and holding step in a plurality of sub-steps as described above, resin particles can be impregnated with a blowing agent in the course of their heating in the heating step. In this case, the impregnation of the resin particles with the blowing agent can be effected after the resin particles have been heated to the final holding temperature (foaming temperature).

In the process of the present invention, the foaming temperature at which the foamable resin particles and the dispersing medium are released into an atmosphere having a pressure lower than that inside the vessel to allow the foamable resin particles to undergo foaming is at least equal to the softening temperature of the foamable resin particles. A temperature around the melting point is however particularly preferred. The preferred foaming temperature range varies depending on the kind of the resin. In the case of an uncrosslinked polypropylene resin for example, a temperature range at least equal to (the melting point minus 5° C.) but not higher than (the melting point plus 15° C.), especially a temperature range at least equal to (the melting point minus 3° C.) but not higher than (the melting point plus 10° C.) is preferred. In the case of a polyethylene resin, a temperature range at least equal to (the melting point minus 10° C.) but not higher than (the melting point plus 5° C.) is preferred. Further, the heating rate upon heating the resin particles to their foaming temperature is preferably 114 10° C./min., with 2-5° C./min. being especially preferred. Upon releasing the foamable resin particles and the dispersing medium from the vessel, the pressure of the atmosphere may be any pressure lower than that inside the vessel but is the atmospheric pressure in general.

It is necessary to maintain the foamable resin particles under a pressure that prevents their foaming inside the vessel, generally at an elevated pressure of 5 kg/cm$^2$·G or higher. In some conventional processes in which foamable resin particles are released into an atmosphere having a pressure lower than that inside the vessel to allow them to undergo foaming, it is attempted to stabilize the expansion ratio by holding foamable resin particles at foaming temperature for a while and then releasing them from the vessel by applying a back pressure with nitrogen gas while maintaining the internal pressure of the vessel at a level equal to or higher than the vapor pressure of an associated blowing agent.

However, when a blowing agent of the inorganic gas type, typically carbon dioxide is used and foamable resin particles are released for their foaming into an atmosphere having a pressure lower than that inside the vessel while applying a back pressure with nitrogen gas alone as in the conventional foaming processes, the expansion ratio of the resulting prefoamed particles decreases considerably as time goes on from the initiation of the release. Use of a blowing agent of the inorganic gas type as a blowing agent therefore requires to conduct the foaming while applying a back pressure with the same inorganic gas as the inorganic gas employed as a blowing agent or with a mixed gas of the same inorganic gas and another inorganic gas. When the blowing agent is a mixed gas such as air, the same inorganic gas as the blowing agent, said same inorganic gas being employed to apply the back pressure, is only required to have the same principal components. When the blowing agent is air by way of example, it is possible to use air, nitrogen, an air/nitrogen mixed gas or the like as the same inorganic gas as the blowing agent. When carbon dioxide is employed as a blowing agent, it is preferable to use nitrogen, air, argon or the like as another inorganic gas different from the inorganic gas employed as the blowing agent. The mixing ratio of the same inorganic gas as the blowing agent to another inorganic gas may preferably range from 3:7 to 9.5:0.5 by weight. This mixed gas is supplied such that the internal pressure of the vessel is maintained at a level at least equal to the prefoaming partial pressure of the blowing agent of the inorganic gas type inside the vessel throughout the step in which the resin particles are released. If the internal pressure of the vessel during the foaming is lower than the partial pressure of the blowing agent of the inorganic gas type inside the vessel before the foaming, the expansion ratio of the resulting prefoamed particles gradually becomes smaller although this decrease of the expansion ratio varies depending on the level of the internal pressure of the vessel during the foaming. The preferred pressure range of a mixed gas to be fed to apply a back pressure is 10–50 kg/cm$^2$·G when its mixing ratio falls within the range specified above.

When a blowing agent of the inorganic gas type is used, it is preferable to perform foaming by impregnating resin particles with the blowing agent within a vessel, feeding the same inorganic gas as the blowing agent or a mixed gas of the same inorganic gas and another inorganic gas different from the blowing agent, said former same inorganic gas or said another inorganic gas having a pressure at least equal to the partial pressure of the blowing agent in the vessel, into the vessel and once holding the thus-impregnated resin particles at their foaming temperature, and then releasing the resulting resin particles from the vessel while applying a back pressure as described above. The another inorganic gas as employed here is similar to the another inorganic gas employed in the above-described mixed gas and is different from the inorganic gas employed as the blowing agent. When the blowing agent is carbon dioxide, the term "another inorganic gas" means an inorganic gas other than carbon dioxide. In this process, it is desirable to feed the same inorganic gas as the blowing agent or the mixed gas of the same inorganic gas as the blowing agent and another inorganic gas immediately after raising the internal temperature of the vessel to the foaming temperature. The most desirable embodiment of this process comprises applying a predetermined back pressure immediately after the internal temperature of the vessel has been raised to the foaming temperature, maintaining resin particles for a while under the same conditions to promote further impregnation of the resin particles with the same inorganic gas as the blowing agent or the mixed gas and then releasing the foamable resin particles out of the vessel while continuously maintaining the internal pressure of the vessel at a predetermined level.

When resin particles are foamed as described above, the resulting prefoamed particles can be obtained at a still greater expansion ratio with small variations. In addition, even when the inorganic gas contains oxygen, the oxidative deterioration of the resin particles and hence of the resulting prefoamed resin particles can be minimized.

In this invention, the melting point of the above resin is the temperature corresponding to the peak of an endothermic peak (inherent peak) on a DSC curve which is obtained when about 6 mg of its sample are heated at the rate of 10.C./min to 220° C, cooled at the cooling rate of 10° C./min to about 50° C. and again heated at the rate of 10° C./min to 220° C. on a differential scanning calorimeter. On the other hand, its melting completion temperature means the temperature given when the endothermic peak (inherent peak) on a second DSC curve obtained by a similar measurement to the above measurement returns to the position of the base line. Further, the softening temperature of resin particles means the softening temperature as determined under the load of 4.6 kg/cm$^2$ in accordance with the method prescribed under ASTM-D-648.

The present invention will hereinafter be described in further detail by the following examples.

EXAMPLES 1–5

Each of the water-soluble inorganic substances shown in Table 1 was separately added in the corresponding amount, also shown in Table 1, per 100 parts by weight of an uncrosslinked ethylene-propylene random copolymer resin (ethylene content: 2.3 wt.%, melting point: 146.5° C., melting completion temperature: 165° C.), followed by melting and kneading in an extruder. After the resultant mass was extruded in the form of strands through a die fitted in a free end of the extruder and was then quenched in water, the strands were chopped so that they were pelletized into a pellet-like configuration (length of resin particles: 2.4 mm, diameter at cross-section of resin particles: 1.1 mm). Those resin particles (100 kg) were added with 400 g of fine aluminum oxide powder and 220 l of water. Without raising the temperature of the resin particles to their melting completion temperature or higher, the resultant dispersion was heated to the first-stage holding temperature shown in Table 1 and held at that temperature, under stirring within a closed vessel (capacity: 400 l). The dispersion was then heated to the second-stage holding temperature shown in Table 1. Immediately after that the corresponding blowing agent also given in the same table was fed to raise the internal pressure of the vessel to the corresponding pressure indicated in the same table and the dispersion was thereafter held at the same temperature. While being maintained at the second-stage holding temperature, a back pressure was applied with nitrogen gas or air (which was chosen to be consistent with the blowing agent employed). While the internal pressure of the vessel was maintained at the level indicated in Table 1, the vessel was opened at one end thereof so that the resin particles and water were released under the atmospheric pressure to allow the resin particles to undergo foaming. The average bulk expansion ratio of each of the resultant samples of prefoamed particles and the maximum and minimum values of its bulk expansion ratio are also given in Table 1.

COMPARATIVE EXAMPLES 1-2

Following the procedures of Examples 1-5 except that the pelletization was conducted by separately adding the non-water-soluble inorganic substances shown in Table 1, foaming was carried out under the conditions given in Table 1 while using a similar ethylene-propylene random copolymer resin to that employed in the examples. The average bulk expansion ratio of each of the resultant samples of prefoamed particles and the maximum and minimum values of its bulk expansion ratio are also given in Table 1.

EXAMPLES 6-7

Samples of prefoamed particles were produced following the procedures of Example 1-5 except that the starting resin particles in Examples 1-5 were changed to uncrosslinked propylene-butene random copolymer resin particles (butene content: 6 wt.%, melting point: 150° C., melting completion temperature: 163° C.) in Example 6 and to uncrosslinked linear low-density polyethylene-butene copolymer resin particles (butene content: 4.1 wt.%, melting point: 121° C, melting completion temperature: 135° C.) in Example 7.

It is however to be noted that the second-stage holding was not effected in Example 7. The average bulk expansion ratio of each of the resultant samples of prefoamed particles and the maximum and minimum values of its bulk expansion ratio are also given in Table 1.

COMPARATIVE EXAMPLES 3-4

Following the procedures of Examples 6-7 except for the use of $CaCO_3$ as an inorganic substance, foaming was carried out. The average bulk expansion ratio of each of the resultant samples of prefoamed particles and the maximum and minimum values of its bulk expansion ratio are also given in Table 1.

EXAMPLES 8-9

Each of the water-soluble inorganic substances shown in Table 1 was separately added in the corresponding amount, also shown in the same table, per 100 parts by weight of an uncrosslinked ethylene-propylene random copolymer resin (ethylene content: 2.3 wt.%, melting point: 146.5° C., melting completion temperature: 165° C.), followed by melting and kneading in an extruder. After the resultant mass was extruded in the form of strands through a die fitted in a free end of the extruder and was then quenched in water, the strands were chopped so that they were pelletized into a pellet-like configuration (length of resin particles: 2.4 mm, diameter at cross-section of resin particles: 1.1 mm). Those resin particles (100 kg) were added with 1.5 kg of fine particulate tricalcium phosphate, 40 g of sodium dodecylbenzenesulfonate, 220 l of water and 7.5 kg (in Example 8) or 7 kg (in Example 9) of solid carbon dioxide (dry ice) as a blowing agent. Without raising the temperature of the resin particles to their melting completion temperature or higher, the resultant dispersion was heated to the first-stage holding temperature shown in Table 1 and held at that temperature, under stirring within a closed vessel (capacity: 400 l). The dispersion was then heated to the second-stage holding temperature shown in Table 1. Immediately after that, the blowing agent (carbon dioxide) was fed further to raise the internal pressure of the vessel to the corresponding pressure indicated in the same table and the dispersion was thereafter held at the same temperature. While being maintained at the second-stage holding temperature, the vessel was opened at one end thereof under a back pressure applied with carbon dioxide so that the resin particles and water were released under the atmospheric pressure to allow the resin particles to undergo foaming. The average bulk expansion ratio of each of the resultant samples of prefoamed particles and the maximum and minimum values of its bulk expansion ratio are also given in Table 1.

TABLE 1

| | Inorganic substance | | | Internal pressure of vessel right before feeding inorganic gas ($kg/cm^2 \cdot G$) | First-stage holding | | Second-stage holding | |
|---|---|---|---|---|---|---|---|---|
| | Kind | Solubility in 100 g of water of 40° C. | Amount added (wt. part) | | Temperature (°C.) | Time (min) | Temperature (°C.) | Time (min) |
| Example | | | | | | | | |
| 1 | Borax (anhydrous) | ≧20 g | 0.3 | 6 | 150 | 15 | 155 | 15 |
| 2 | Borax (decahydrate) | ≧20 g | 0.2 | 6 | 150 | 15 | 155 | 15 |
| 3 | Aluminum sulfate (octadecahydrate) | ≧20 g | 0.2 | 6 | 150 | 15 | 155 | 15 |
| 4 | Nickel sulfate (hexahydrate) | ≧20 g | 0.2 | 6 | 150 | 15 | 155 | 15 |

TABLE 1-continued

| | | | | | | | | |
|---|---|---|---|---|---|---|---|---|
| 5 | Sodium chloride | ≧20 g | 0.2 | 6 | 150 | 15 | 155 | 15 |
| 6 | Borax (decahydrate) | ≧20 g | 0.4 | 6 | 152 | 15 | 157 | 15 |
| 7 | Borax (decahydrate) | ≧20 g | 0.5 | 6 | 115 | 15 | — | — |
| 8 | Borax (anhydrous) | ≧20 g | 0.2 | 40.5[1) | 148 | 15 | 153 | 15 |
| 9 | Borax (anhydrous) | ≧20 g | 0.2 | 36[2) | 147 | 15 | 152 | 15 |
| Comp. Ex. | | | | | | | | |
| 1 | Aluminum hydroxide | 0 g | 0.3 | 6 | 150 | 15 | 155 | 15 |
| 2 | Calcium carbonate | 0.0015 g | 0.2 | 6 | 150 | 15 | 155 | 15 |
| 3 | Calcium carbonate | 0.0015 g | 0.4 | 6 | 152 | 15 | 157 | 15 |
| 4 | Calcium carbonate | 0.0015 g | 0.5 | 6 | 115 | 15 | — | — |

| | Blowing agent | | Blowing conditions | | Prefoamed particles | | |
|---|---|---|---|---|---|---|---|
| | Kind | Internal pressure of vessel after feeding inorganic gas ($kg/cm^2 \cdot G$) | Internal pressure of vessel during foaming ($kg/cm^2 \cdot G$) | Secondary crystals in prefoamed particles | Average bulk expansion ratio (times) | Variations of expansion ratio | |
| | | | | | | Maximum (times) | Minimum (times) |
| Example | | | | | | | |
| 1 | Air | 50 | 47 | Contained | 22 | 23 | 20 |
| 2 | Nitrogen | 45 | 45 | Contained | 19 | 21 | 18 |
| 3 | Air | 45 | 42 | Contained | 23 | 24 | 22 |
| 4 | Air | 45 | 45 | Contained | 17 | 18 | 16 |
| 5 | Air | 45 | 45 | Contained | 15 | 16 | 14 |
| 6 | Air | 30 | 28 | Contained | 20 | 21 | 19 |
| 7 | Air | 45 | 43 | Contained | 13 | 14 | 13 |
| 8 | $CO_2$ | 45 | 42 | Contained | 54 | 55 | 53 |
| 9 | $CO_2$ | 36 | 36 | Contained | 31 | 31 | 29 |
| Comp. Ex. | | | | | | | |
| 1 | Air | 50 | 47 | Contained | 12 | 13 | 11 |
| 2 | Nitrogen | 45 | 45 | Contained | 11 | 12 | 11 |
| 3 | Air | 30 | 28 | Contained | 7 | 8 | 7 |
| 4 | Air | 25 | 28 | Contained | 6 | 6 | 5 |

[1)]Due to advance addition of 7.5 kg of dry ice.
[2)]Due to advance addition of 7.0 kg of dry ice.

EXAMPLES 10–13

In each example, a propylene-ethylene random copolymer resin (ethylene content: 2.3 wt.%, melting completion temperature: 165° C.) was added with borax ($Na_2B_4O_7 \cdot 10H_2O$, average particle size: 50 μm) in a proportion to give 0.2 wt.% in an extruder, followed by melting and kneading. The resulting mass was extruded in the form of strands through a die fitted in a free end of the extruder and was then quenched in water. The strands were chopped into pellet-like particles (length of resin particles: 2.4 mm, diameter at cross-section of resin particles: 1.1 mm). Those particles (100 kg) were added with 1 kg of tricalcium phosphate, 250 q of sodium dodecylbenzenesulfonate, 220 l of water and dry ice as a blowing agent in the corresponding amount shown in Table 2. Without raising the temperature of the particles to their melting completion temperature or higher, the resultant dispersion was heated to the first-stage holding temperature shown in the same table and held at that temperature, under stirring within a closed vessel (capacity: 400 l). Next, with a mixed gas obtained by adding the inorganic gas shown in Table 2 to 100 parts of carbon dioxide at the weight ratio given in the same table, the internal pressure of the vessel was elevated to the level shown in the same table. At the same time, the dispersion was heated to the second-stage holding temperature shown in the same table. While applying a back pressure with the mixed gas and maintaining the internal temperature and pressure of the vessel at the same levels, the vessel was opened at one end thereof so that the resin particles and water were released under the atmospheric pressure to allow the resin particles to undergo foaming. The average bulk expansion ratio of the resultant prefoamed particles and the maximum and minimum values of their bulk expansion ratio are also given in Table 2.

COMPARATIVE EXAMPLE 5–6

In a similar manner to Examples 10 and 11 except that pelletization was conducted without addition of borax, foaming was carried out using a similar propylene-ethylene random copolymer to that employed in Examples 10 and 11. The average bulk expansion ratio of each of the resultant samples of prefoamed particles and the maximum and minimum values of its bulk expansion ratio are also given in Table 2.

COMPARATIVE EXAMPLE 7

Foaming was conducted in a similar manner to Example 10 except that the internal pressure of the vessel was maintained at 10 $kg/cm^2 \cdot G$ during foaming. The results are shown in Table 2.

COMPARATIVE EXAMPLES 8–9

In the procedures of Examples 12 and 13, the back pressure was applied using nitrogen alone instead of the mixed gas of carbon dioxide and air. The internal pressure of the vessel after the feeding of nitrogen Was set at the same level as in Examples 12 and 13. The average bulk expansion ratio of the resultant prefoamed particles and the maximum and minimum values of their bulk expansion ratio are also given in Table 2.

EXAMPLES 14–15

In each example, prefoamed particles were obtained under the conditions given in Table 2 by using resin particles which have been obtained in a similar manner to Examples 10–13 except for the use of a propylene-butene random copolymer resin (butene content: 6.0 wt.%, melting completion temperature: 163° C.) in place of the propylene-ethylene random copolymer resin. The average bulk expansion ratio of each of the resultant samples of prefoamed particles and the maximum d minimum values of its bulk expansion ratio are also given in Table 2.

TABLE 2

| | Amount of blowing agent (dry ice) added (kg) | Heating temperature conditions | | | | Vapor pressure of carbon dioxide in vessel right before feeding mixed gas | Inorganic gas in mixed gas | |
|---|---|---|---|---|---|---|---|---|
| | | First-stage holding | | Second-stage holding | | | | |
| | | Temp. (°C.) | Time (min) | Temp. (°C.) | Time (min) | | Kind | Proportion |
| Example | | | | | | | | |
| 10 | 2 | 148 | 15 | 153 | 15 | 14 | Nitrogen | 70 |
| 11 | 2 | 148 | 15 | 153 | 15 | 14 | Nitrogen | 70 |
| 12 | 4 | 148 | 15 | 153 | 15 | 21 | Air | 60 |
| 13 | 7 | 147 | 15 | 152 | 15 | 33 | Air | 30 |
| 14 | 4 | 149 | 15 | 154 | 15 | 21 | Air | 60 |
| 15 | 7 | 148 | 15 | 153 | 15 | 33 | Nitrogen | 30 |
| Comp. Ex. | | | | | | | | |
| 5 | 2 | 148 | 15 | 153 | 15 | 14 | Nitrogen | 70 |
| 6 | 2 | 148 | 15 | 153 | 15 | 14 · | Nitrogen | 70 |
| 7 | 2 | 148 | 15 | 153 | 15 | 14 | Nitrogen | 70 |
| 8 | 4 | 148 | 15 | 153 | 15 | 21 | — | — |
| 9 | 7 | 147 | 15 | 152 | 15 | 33 | — | — |

| | Internal pressure of vessel during foaming (kg/cm² · G) | Feeding time of mixed gas | Secondary crystals in prefoamed particles | Prefoamed particles | | |
|---|---|---|---|---|---|---|
| | | | | Average bulk expansion ratio (times) | Variations of expansion ratio | |
| | | | | | Maximum (times) | Minimum (times) |
| Example | | | | | | |
| 10 | 35 | Immediately before foaming | Contained | 15 | 18 | 14 |
| 11 | 35 | Right after the initiation of second-stage holding | Contained | 17 | 18 | 16 |
| 12 | 40 | Right after the initiation of second-stage holding | Contained | 22 | 23 | 21 |
| 13 | 45 | Right after the initiation of second-stage holding | Contained | 32 | 33 | 31 |
| 14 | 40 | Right after the initiation of second-stage holding | Contained | 23 | 24 | 22 |
| 15 | 45 | Right after the initiation of second-stage holding | Contained | 33 | 34 | 32 |
| Comp. Ex. | | | | | | |
| 5 | 35 | Immediately before foaming | Contained | 8 | 9 | 7 |
| 6 | 35 | Right after the initiation of second-stage holding | Contained | 10 | 11 | 9 |
| 7 | 10 | Right after the initiation of second-stage holding | Contained | 5 | 7 | 2 |
| 8 | 40 | Right after the initiation of second-stage holding*) | Contained | 8 | 11 | 4 |
| 9 | 45 | Right after the initiation of second-stage holding*) | Contained | 24 | 32 | 15 |

*)Feeding time of nitrogen gas

We claim:
1. A method for the production of prefoamed synthetic resin particles, which comprises:
dispersing foamable resin particles in a dispersing medium with a closed vessel, said foamable resin particles containing a water-soluble inorganic salt in a total amount of 0.01 to 2.0 wt.% based on the resin particles and a blowing agent therein;
heating the foamable resin particles to a temperature at least equal to the softening point thereof in the dispersing medium within the closed vessel; and
releasing the foamable resin particles and the medium into an atmosphere of a pressure lower than that inside the vessel, whereby the thus-released foamable resin particles are allowed to undergo foaming.

2. A method for the production of prefoamed synthetic resin particles, which comprises:
releasing foamable resin particles—which have been obtained by dispersing resin particles, with a water-soluble inorganic salt contained therein in a total amount of 0.01 to 2.0 wt.% based on the resin particles, in a dispersing medium within a closed vessel and then impregnating the resin particles with a blowing agent—together with the dispersing medium at a temperature at least equal to the softening point thereof into an atmosphere of a pressure lower than that inside the vessel, whereby the thus-released foamable resin particles are allowed to undergo foaming.

3. A method for the production of prefoamed synthetic resin particles, which comprises:
dispersing foamable resin particles having been obtained by impregnating with a blowing agent of the inorganic gas type uncrosslinked polypropylene resin particles containing a water-soluble inorganic salt therein in a total amount of 0.01 to 2.0 wt.% based on the resin particles;
holding the foamable resin particles for 5–90 minutes at a temperature at least equal to (the melting point of the foamable resin particles minus 20° C.) but lower than the melting completion temperature thereof without raising the temperature of the foamable resin particles to the melting completion temperature thereof or higher in the course of the heating thereof; and releasing the foamable resin particles and the medium at a temperature at least equal to (the melting point of the foamable resin particles minus 5° C.) but not higher than (the melting point of the foamable resin particles plus 15° C.) into an atmosphere of a pressure lower than that inside the vessel, whereby the thus-released foamable resin particles are allowed to undergo foaming.

4. A method for the production of prefoamed synthetic resin particles, which comprises:

dispersing uncrosslinked polypropylene resin particles in a dispersing medium within a closed vessel, said uncrosslinked polypropylene resin particles containing a water-soluble inorganic salt therein in a total amount of 0.01 to 2.0 wt.% based on the resin particles;

holding the uncrosslinked polypropylene resin particles for 5-90 minutes at a temperature at least equal to (the melting point of the foamable resin particles minus 20° C.) but lower than the melting completion temperature thereof without raising the temperature of the uncrosslinked polypropylene resin particles to the melting completion temperature thereof or higher in the course of the heating thereof; and feeding a blowing agent of the inorganic gas type into a closed vessel;

impregnating the uncrosslinked polypropylene resin particles with a blowing agent of the inorganic gas type at a temperature at least equal to (the melting point of the resin particles minus 5° C.) but not higher than (the melting point of the resin particles plus 15° C.), thereby forming foamable resin particles; and releasing the foamable resin particles and the medium at the same temperature into an atmosphere of a pressure lower than that inside the vessel, whereby the thus-released foamable resin particles are allowed to undergo foaming.

5. A method for the production of prefoamed synthetic resin particles, which comprises:

dispersing foamable resin particles in a dispersing medium within a closed vessel, said foamable resin particles having been obtained by impregnating with a blowing agent of the inorganic gas type uncrosslinked linear low-density polyethylene resin particles containing a water-soluble inorganic salt therein in a total amount of 0.01 to 2.0 wt.% based on the resin particles;

holding the foamable resin particles for 5-90 minutes at a temperature at least equal to (the melting point of the foamable resin particles minus 15° C.) but lower than the melting completion temperature thereof without raising the temperature of the foamable resin particles to the melting completion temperature thereof or higher in the course of the heating thereof; and releasing the foamable resin particles and the medium at a temperature at least equal to (the melting point of the foamable resin particles minus 10° C.) but not higher than (the melting point of the foamable resin particles plus 5° C.) into an atmosphere of a pressure lower than that inside the vessel, whereby the thus-released foamable resin particles are allowed to undergo foaming.

6. A method for the production of prefoamed synthetic resin particles, which comprises:

dispersing uncrosslinked linear low-density polyethylene resin particles in a dispersing medium within a closed vessel, said uncrosslinked polyethylene resin particles containing a water-soluble inorganic salt therein in a total amount of 0.01 to 2.0 wt.% based on the resin particles;

holding the uncrosslinked low-density polyethylene resin particles for 5-90 minutes at a temperature at least equal to (the melting point of the uncrosslinked linear low-density polyethylene resin particles minus 15° C.) but lower than the melting completion temperature thereof without raising the temperature of the melting completion temperature thereof or higher in the course of the heating thereof;

feeding a blowing agent of the inorganic gas type into a closed vessel;

impregnating the uncrosslinked linear low-density polyethylene resin particles with a blowing agent of the inorganic gas type at a temperature at least equal to (the melting point of the uncrosslinked linear low density polyethylene resin particles minus 10° C.) but not higher than (the melting point of the uncrosslinked linear low-density polyethylene resin particles plus 5° C.), thereby forming foamable resin particles; and releasing the foamable resin particles and the dispersing medium into an atmosphere of a pressure lower than that inside the vessel, whereby the resin particles are allowed to undergo foaming.

7. A method for the production of prefoamed synthetic resin particles, which comprises:

dispersing resin particles, which contain a water-soluble inorganic salt therein in a total amount of 0.01 to 2.0 wt.% based on the resin particles, in the presence of a blowing agent of the inorganic gas type in a dispersing medium within a closed vessel and then heating the resin particles to a least a temperature at which the resin particles are softened, whereby the resin particles are impregnated with the blowing agent of the inorganic gas type; and releasing the thus-impregnated foamable resin particles and the dispersing medium into an atmosphere of a pressure lower than that inside the vessel while applying a back pressure with the same inorganic gas as the blowing agent or a mixed gas of the same inorganic gas as the blowing agent and another inorganic gas different from the blowing agent such that the internal pressure of the vessel is held at a pressure at least equal to the partial pressure of the blowing agent of the inorganic gas type within the vessel, whereby the thus-released resin particles are allowed to undergo foaming.

8. A method for the production of prefoamed synthetic resin particles, which comprises:

dispersing resin particles, which contain a water-soluble inorganic salt therein in a total amount of 0.01 to 2.0 wt.% based on the resin particles, in the presence of a blowing agent of the inorganic gas type in a dispersing medium within a closed vessel and then heating the resin particles to a least a temperature at which the resin particles are softened, whereby the resin particles are impregnated with the blowing agent of the inorganic gas type;

feeding the same inorganic gas as the blowing agent of a mixed gas of the same inorganic gas as the blowing agent and another inorganic gas different from the blowing agent, said former same inorganic gas or mixed gas having a partial pressure at least equal to the partial pressure of the blowing agent of the inorganic gas type in the vessel, into the vessel and holding the thus-impregnated resin particles at a foaming temperature thereof; and releasing the thus-impregnated foamable resin particles and the dispersing medium into an atmosphere of a pressure lower than that inside the vessel while applying a back pressure with the same inorganic gas as the blowing agent or a mixed gas of the same inorganic gas as the blowing agent and another inorganic gas different from the blowing agent such that the internal pressure of the vessel is held at a pressure at least equal to the partial pressure of the blowing agent of the inorganic gas type within the vessel, whereby the thus-released resin particles are allowed to undergo foaming.

9. A method of claim 1 or 2, wherein the blowing agent is a volatile blowing agent.

10. A method of claim 1 or 2, wherein the blowing agent is of the inorganic gas type.

11. A method of claim 7 or 8, wherein the thus-impregnated resin particles and the dispersing medium are released while applying a back pressure with a mixed gas of the same inorganic gas as the blowing agent and another inorganic gas different from the blowing agent at a weight ratio of from 3:7 to 9.5:0.5.

12. The method of any one of claims 1–8, wherein the water-soluble inorganic salt is borax.

13. The method of any one of claims 1–8, wherein the water-soluble inorganic salt is contained in a proportion of 0.02–1 wt.% based on the resin particles.

14. The method of any one of claims 1–8, wherein the water-soluble inorganic salt has an average particle size of 0.1–150 μm.

15. The method of any one of claims 1–8, wherein the solubility of the water-soluble inorganic salt in 100 g of water of 40° C. is at least 5 g.

16. The method of any one of claims 1–8 wherein the solubility of the water-soluble inorganic salt in 100 g of water of 40° C. is at least 1 g.

17. The method of any one of claims 1–8 wherein the water-soluble inorganic salt is selected from the group consisting of borax, nickel sulfate, manganese sulfate, sodium chloride, magnesium chloride and calcium chloride.

* * * * *